United States Patent Office 2,795,595
Patented June 11, 1957

2,795,595
METHOD FOR BLEACHING VEGETABLE OILS

Arthur A. Elston, Niagara Falls, N. Y., assignor to E. I. du Pont de Nemours and Company, Wilmington, Del., a corporation of Delaware No Drawing. Application September 30, 1954, Serial No. 459,525

4 Claims. (Cl. 260—423)

This invention relates to an improved method for bleaching vegetable oils and particularly soybean oil.

Soybean oil is generally refined by treating it with a caustic soda solution and subsequently with active adsorbents such as bleaching earths and activated carbon. Such a method is not very satisfactory for obtaining light-colored oil and it also involves the loss of considerable oil in the press cake obtained when the adsorbent is filtered from the oil.

It is an object of the invention to provide an improved method for bleaching vegetable oils whereby oils of improved color can be readily obtained. Further objects will be apparent from the following description.

The objects of the invention are achieved by treating the vegetable oil which is to be bleached sequentially with chromium trioxide, hydrogen peroxide and a strong alkali. It has been found that exceptionally good bleaching results from the treatments with such agents in the sequence stated.

In a preferred embodiment of the invention the oil to be bleached is treated in a first stage with from 0.1 to 2% chromium trioxide, then in a second stage with 0.1 to 2% hydrogen peroxide (calculated as 100% $H_2O_2$) and finally in a third stage with 0.04 to 2% caustic soda or some other alkali metal hydroxide or equivalent strong alkali, all percentages being based upon the weight of the oil and all reagents being used in the presence of an aqueous phase. The reagents are added to the oil with agitation, which agitation is continued throughout each treatment. Satisfactory results are achieved during about 0.5–2 hrs. for each treatment at about 160° F., but the time may be considerably longer or shorter depending on the temperature and reagent concentrations used. Higher temperatures and greater concentrations of the reagents favor shorter times. Following the final treatment with caustic soda, the bleached oil is separated from sludge formed, e. g., by filtration.

The invention is illustrated by the following examples in which all parts and percentages are parts and percentages by weight. The color ratings given are according to standards prepared by the Fats Analysis Committee of the American Oil Chemists Society and are reported as FAC color ratings of 11B, 9, 2, etc., the higher the number the poorer being the color.

Example 1

To 100 parts of a dry, degummed, extracted soybean oil heated to 160° F. there was added under vigorous agitation about 5 parts of an aqueous solution containing 0.25 part of chromium trioxide ($CrO_3$). After agitating for 1 hr. at 160° F., 0.3 part of 35% aqueous hydrogen peroxide (equal to 0.11 part $H_2O_2$) was added to the mixture and agitation was continued for another hour. About 0.2 part of caustic soda was added as a 10% aqueous solution and after a further 1 hr. of agitation at 160° F., the mixture was filtered through a fluted filter paper. The filtered oil had an FAC color rating of 3 as compared with a rating of 11B for the original oil.

Example 2

About 1 part of 35% aqueous hydrogen peroxide (equal to about 0.35 part $H_2O_2$) was added dropwise to 100 parts of soybean oil under vigorous agitation at 160° F. Agitation was continued for 1 hr. at 160° F., then the mixture was let stand for 16 hrs. at room temperature. The oil was then reheated to 160° F. and filtered as in Example 1. The filtered oil had an FAC color rating of 11B. Since the original oil had the same rating, no bleaching resulted from the treatment with peroxide alone.

Example 3

The chromium trioxide treatment of Example 1 was repeated using, however, one part of the chromium trioxide dissolved in 5 parts of water per 100 parts of oil. The oil was then treated with about 0.8 part of caustic soda added as a 20% aqueous solution and agitated for 0.5 hr. at 160° F. Filtering the mixture as in Example 1 gave an oil with an FAC color rating of 2 as compared with 11B for the original oil.

The above example shows that if sufficient chromium trioxide is used, a fairly well bleached oil can be obtained without the intermediate peroxide treatment. However, when the chromium trioxide used was reduced to 0.25 to 0.5 part per 100 parts of oil, bleaching was ineffective in the absence of an intermediate peroxide treatment. Thus, under otherwise similar conditions, omission of the intermediate peroxide treatment when using 0.25 part chromium trioxide gave a final color rating of FAC 10, while 0.5 part chromium trioxide without the intermediate peroxide treatment gave an FAC rating substantially unchanged from that for the original oil.

Example 4

Example 1 was repeated except that the final treatment with caustic soda was omitted and one part of chromium trioxide in 5 parts of water and about 1 part of 35% aqueous hydrogen peroxide (0.35 g. $H_2O_2$) were used per 100 parts of oil. The final oil had an FAC color rating of 19.

Example 5

23 parts of the oil treated in Example 4 having an FAC color rating of 19 was treated under agitation for 1 hr. at 160° F. with about 0.04 part of caustic soda added as a 20% solution. After filtering the oil as in Example 1, its FAC color rating was 1.

Examples 4 and 5 show that a final treatment with a strong alkali is essential to the obtainment of a light-colored product.

The examples show bleaching soybean oil but the method of the invention is not limited thereto since it is effective and can be advantageously used in bleaching vegetable oils generally. Examples of such oils are linseed oil, cottonseed oil, corn oil, palm oil, castor oil and the like.

The amounts of reagents and temperatures used will depend somewhat upon the particular oil which is to be bleached and the degree of bleaching desired. Reagent amounts of from about 0.05 to 5 parts chromium trioxide, from about 0.05 to 5 parts $H_2O_2$ and from about 0.02 to 10 parts strong alkali, calculated as NaOH, will generally give good results. Larger amounts can be used but generally will be uneconomical. Temperatures somewhat above room temperature are desirable to increase reaction rates and to decrease viscosity of the oil thereby increasing effectiveness of agitation. Temperatures sufficiently high to cause decomposition of the oil should, of course, be avoided. As a general rule, temperatures ranging from about 90 to 210° F. are satisfactory but temperatures outside this range can be used.

Any water-soluble hexavalent chromium compound such as the alkali metal bichromates, can be used in place of chromium trioxide, provided such compounds are used under non-alkaline conditions.

It is preferred that the hydrogen peroxide be used under non-alkaline conditions, e. g. slightly acidic, although the degree of acidity does not appear to be important. Commercial hydrogen peroxide solutions, usually containing from around 27 to 50% or more $H_2O_2$ by weight, are non-alkaline and can be used as purchased. The hydrogen peroxide can, of course, be derived from other sources, e. g., from sodium peroxide, percarbonates, perphosphates, peracetic acid and like compounds known to yield hydrogen peroxide in aqueous solutions.

It is preferred to use caustic soda in the final treatment but other strongly alkaline materials such as other alkali metal hydroxides, the alkaline earth metal hydroxides and the alkali metal carbonates can also be used.

I claim:

1. The method of bleaching soybean oil comprising agitating said oil for 0.5 to 2 hrs. at a temperature within the range 90 to 210° F. with 0.05 to 5 parts of chromium trioxide, adding 0.05 to 5 parts of hydrogen peroxide and continuing the agitation for 0.5 to 2 hrs. at a temperature within said temperature range, adding 0.02 to 10 parts of caustic soda and continuing said agitation at a temperature within said temperature range for 0.5 to 2 hrs., then separating the oil from the resulting mixture, the stated parts of reagents being parts per 100 parts by weight of oil, all reagents being added in aqueous solution.

2. The method of claim 1 wherein the amounts of chromium trioxide, hydrogen peroxide and caustic soda used are in the ranges 0.1 to 2%, 0.1 to 2% and 0.04 to 2%, respectively.

3. The method of claim 2 wherein the temperature is about 160° F.

4. The method of bleaching a vegetable oil comprising agitating said oil for 0.5 to 2 hrs. at a temperature within the range 90° to 210° F. with 0.05 to 5 parts chromium trioxide, adding 0.05 to 5 parts of hydrogen peroxide and continuing the agitation for 0.5 to 2 hrs. at a temperature within said temperature range, adding 0.02 to 10 parts of caustic soda and continuing said agitation at a temperature within said temperature range for 0.5 to 2 hrs., then separating the oil from the resulting mixture, the stated parts of reagents being parts per 100 parts by weight of oil, all reagents being added in aqueous solution.

References Cited in the file of this patent

UNITED STATES PATENTS

| | | |
|---|---|---|
| 1,767,886 | Hellthaler | June 24, 1930 |
| 2,221,140 | Jahrstorfer et al. | Nov. 12, 1940 |
| 2,250,203 | Noder | July 22, 1941 |
| 2,592,226 | Woodward | Apr. 8, 1952 |